United States Patent [19]

Goddard

[11] 4,327,586

[45] May 4, 1982

[54] STUFFING BOX FOR INTRODUCING INSTRUMENT INTO HIGH PRESSURE CONDUIT

[75] Inventor: Christopher D. J. Goddard, Farnham, England

[73] Assignee: Redland Automation Limited, Winchester, England

[21] Appl. No.: 172,740

[22] Filed: Jul. 28, 1980

[30] Foreign Application Priority Data

Sep. 10, 1979 [GB] United Kingdom ............... 7931305

[51] Int. Cl.³ .................... F16J 15/06; G01F 15/18; G01K 1/14
[52] U.S. Cl. .................... 73/432 R; 73/30; 277/12; 277/110; 277/116.8; 374/148
[58] Field of Search ............ 73/343 R, 30, 32 R, 73/432 R; 277/12, 110–112, 116.2, 116.6, 116.8, 117–122

[56] References Cited

U.S. PATENT DOCUMENTS

| | | | |
|---|---|---|---|
| 1,983,977 | 12/1934 | Geiger | 277/111 |
| 1,991,371 | 2/1935 | Blanckenburg | 73/343 R |
| 2,232,799 | 2/1941 | Ponsaing | 277/112 |
| 2,234,056 | 3/1941 | Moore | 73/343 R |
| 3,081,631 | 3/1963 | Switzer et al. | 73/343 R |
| 3,091,119 | 5/1963 | Fischer et al. | 73/343 R |
| 3,246,521 | 4/1966 | Humphrey | 73/343 R X |
| 3,911,747 | 10/1975 | Sivyer | 73/343 R |
| 3,979,129 | 9/1976 | Caldwell | 277/110 |
| 3,983,756 | 10/1976 | Danguillier et al. | 73/343 R X |
| 4,096,754 | 6/1978 | Beveridge et al. | 73/343 R X |

FOREIGN PATENT DOCUMENTS 483777 10/1929 Fed. Rep. of Germany .... 73/343 R

*Primary Examiner*—Robert S. Ward, Jr.
*Attorney, Agent, or Firm*—Beveridge, DeGrandi & Kline

[57] ABSTRACT

A stuffing box comprising a housing member having a threaded passage therethrough and having an internally threaded recess, an externally threaded stem which is threaded into and passes through the threaded passage, a gland nut which is disposed in said recess, the gland nut having corresponding internal and external threads which are respectively threaded onto the threaded stem and into the internally threaded recess, and sealing material disposed in said recess, said sealing material being in engagement with the housing member, the threaded stem and the gland nut.

8 Claims, 2 Drawing Figures

STUFFING BOX FOR INTRODUCING INSTRUMENT INTO HIGH PRESSURE CONDUIT

TECHNICAL FIELD

This invention concerns a stuffing box and, although the invention is not so restricted, it is more particularly concerned with a stuffing box forming part of apparatus for introducing an instrument, e.g. a density meter, into and withdrawing it from a high pressure conduit.

BACKGROUND ART

In previous apparatus of this kind the instrument has been carried by a threaded stem which has been sealed to the conduit by means including a gland. The use of the threaded stem prevents the instrument from being ejected from the conduit in the event of faulty use and is therefore "fail safe". The gland, however, has been such as to provide an easy path for the extrusion of the gland material and has therefore been subject to leakage.

Use has also been made previously of a separate screw jack to push the instrument into the conduit. This deals with the leakage problem but has involved the use of a collet to grip the instrument shaft and this does not provide a "fail safe" arrangement as there can easily be slippage between the collet and the instrument shaft if there is misuse.

DISCLOSURE OF THE INVENTION

According, therefore, to the present invention, there is provided a stuffing box comprising a housing member having a threaded passage therethrough and having an internally threaded recess, an externally threaded stem which is threaded into and passes through the threaded passage, a gland nut which is disposed in said recess, the gland nut having corresponding internal and external threads which are respectively threaded onto the threaded stem and into the internally threaded recess, and liquid or solid sealing material disposed in said recess, said sealing material being in engagement with the housing member, the threaded stem and the gland nut.

The sealing material may comprise polytetrafluoroethylene.

The threaded stem may carry or house part of an instrument which is disposed in a conduit. Thus the threaded stem may be a hollow stem within which is mounted and to which is sealed a stem of the instrument or may be part of the instrument.

The housing member may form part of a housing having a valve which is interposed between the said housing member and the conduit, the valve, when open, permitting the instrument to be introduced through the valve and into the conduit, and the valve, when closed after the instrument has been retracted therethrough, dividing the housing into compartments which are sealed from each other, one of said compartments comprising the said housing member and the other compartment being permanently open to the pressure in the conduit.

Preferably, the compartment which comprises the said housing member is provided with a vent valve for venting the pressure therein.

Preferably, moreover, the compartment which comprises the said housing member has separable parts to enable the instrument to be withdrawn therefrom, means being provided for preventing separation of said parts except when the vent valve is open.

BRIEF DESCRIPTION OF DRAWINGS

The invention is illustrated, merely by way of example, in the accompanying drawings, in which.

Figure 1:
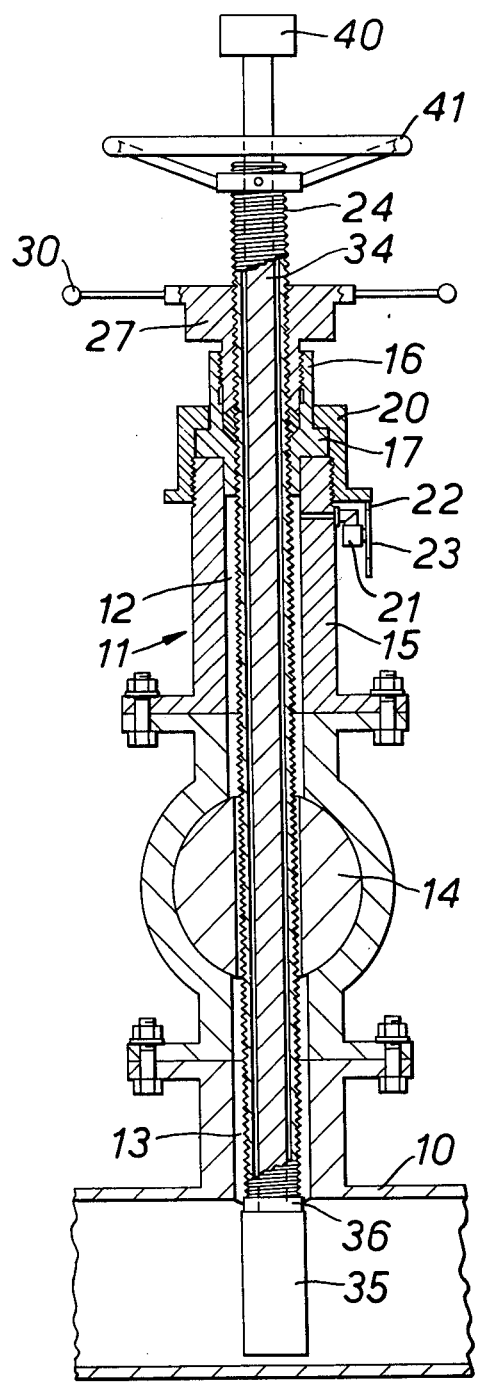
FIG. 1 is a sectional view of apparatus comprising a stuffing box according to the present invention.

Terms such as "upper" and "lower", as used in the description below, are to be understood to refer to directions as seen in the accompanying drawings.

DESCRIPTION OF PREFERRED EMBODIMENT

Referring to the drawings, an high pressure pipeline or other conduit 10 has mounted thereon an housing 11. The housing 11 has compartments 12, 13 which are separable from each other by a ball valve 14 (or by any full bore valve). When the ball valve 14 is in the open position shown in FIG. 1, the interiors of both the compartments 12, 13 are open to the pressure in the conduit 10. When, however, the ball valve 14 is rotated through 90° from the position shown in FIG. 1, it is in a closed position (not shown) in which it serves to seal the compartments 12, 13 from each other so that only the compartment 13 remains open to the pressure in the conduit 10.

The compartment 12 comprises a seal housing 15, and a housing member 16 having a flange 17 which is seated on the upper end of the seal housing 15. The seal housing 15 is externally threaded and the latter is releasably secured to the flange 17 by an internally threaded cup-shaped retaining nut 20.

The compartment 12 may be vented by means of a vent valve 21 which may be constituted by a small ball valve which is movable through 90° between open and closed positions. A projection (or projections) 22, which is provided on the retaining nut 20, is engageable with a handwheel 23 of the vent valve 21 to ensure that the vent valve 21 must have been opened so as to vent the pressure in the compartment 12 before the retaining nut 20 can be turned to permit the housing member 16 to be removed from the seal housing 15.

Figure 2:
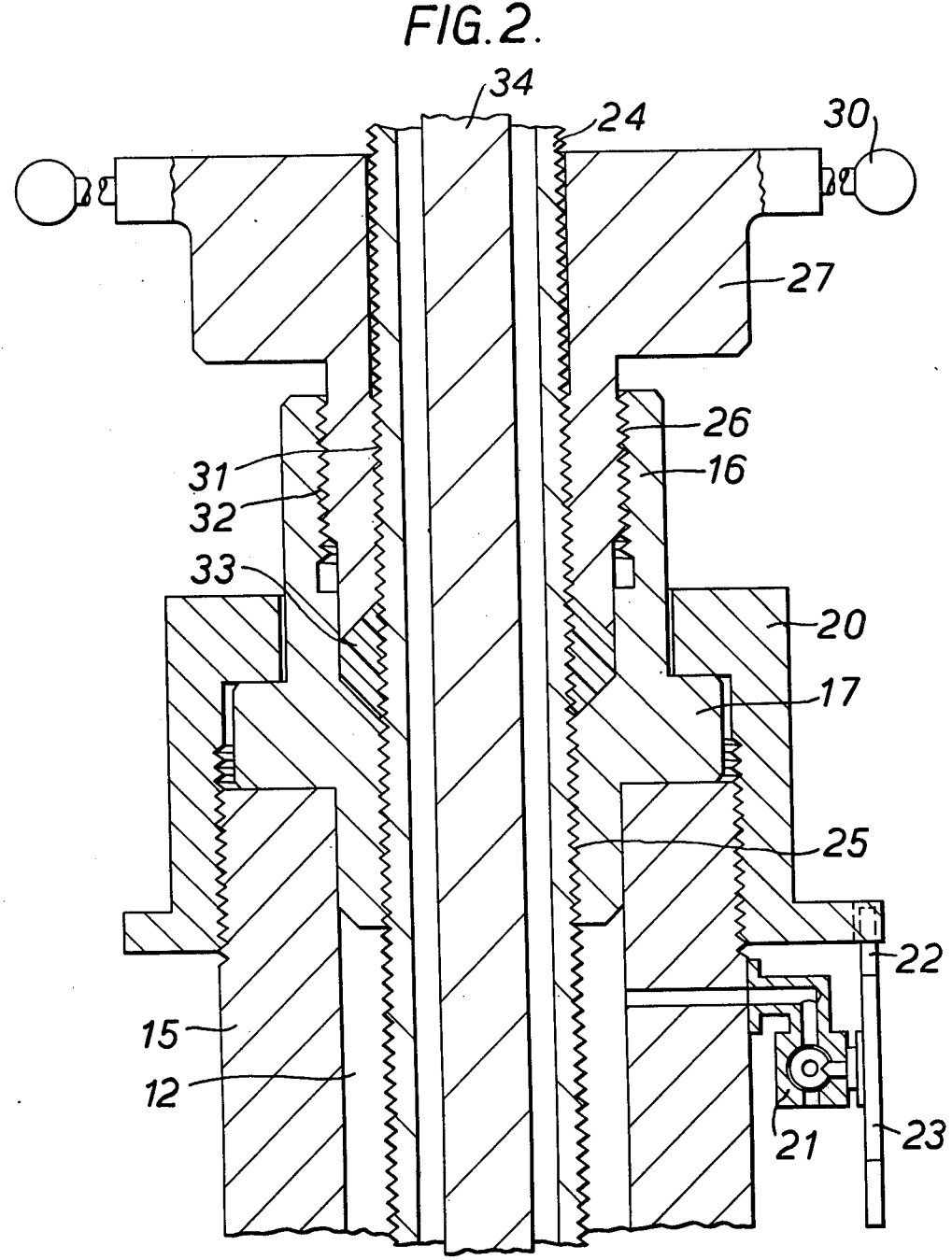
FIG. 2 is a sectional view, on a larger scale, of part of the stuffing box shown in FIG. 1.

An externally threaded hollow stem 24 extends through the housing 11, the hollow stem 24 being threaded into and passing through a threaded passage 25 (FIG. 2) in the housing member 16. The housing member 16 is provided at its upper end with an internally threaded recess 26. A gland nut 27 is disposed in the recess 26, the gland nut 27 having a handwheel 30. The gland nut 27 has corresponding internal and external threads 31, 32 of the same pitch and the same phase, the threads 31, 32 being respectively threaded onto the hollow stem 24 and into the recess 26. Polytetrafluoroethylene, a mixture containing asbestos, or other plastics or solid sealing material 33, is disposed in the recess 26, the sealing material 33 being in engagement with the housing member 16, the hollow stem 24 and the gland nut 27.

Mounted concentrically in the hollow stem 24 is an instrument stem 34 or a density meter or other instrument 35 which is disposed in the conduit 10. The lower end of the hollow stem 24 is sealed to the instrument 34 by an annular compression fitting 36 which seals the space between the stems 24, 34 and enables the hollow stem 34 to carry the instrument 35. Alternatively, the compression fitting 36 may merely seal the said space, the hollow stem 24 merely housing the instrument stem 34 and separate means (not shown) being provided for supporting the latter. The instrument stem 34 may, if desired, be threaded.

Mounted at the upper end of the instrument stem 34 is a detachable amplifier 40 for amplifying signals produced by the instrument 35.

Mounted at the upper end of the hollow stem 24 is an operating handwheel 41. Alternatively, if desired, the operating handwheel 41 may be replaced by a gear box and motor (not shown).

The hollow stem 24 and instrument stem 34 can be passed through the housing 11 so as to introduce the instrument 35 into and to withdraw from the conduit 10 while the latter is under high pressure.

Thus the withdrawal of the instrument 35 from the position shown in FIG. 1 may be effected by releasing the gland nut 27 by rotating the handwheel 30, rotating the operating handwheel 41 to move the instrument 35 into the compartment 12, closing the ball valve 14, opening the vent valve 21 to vent the compartment 12, releasing the retaining nut 20 from the flange 17 and seal housing 15, and lifting the assembly of housing member 16, gland nut 27, stems 24, 34, instrument 35, handwheels 30, 41 and amplifier 40.

Similarly, the instrument 35 can be introduced into the conduit 10 by lowering the said assembly so as to introduce the instrument 35 into the compartment 12, closing the vent valve 21, rotating the retaining nut 20 to the position shown in FIG. 1 in which it secures together the flange 17 and seal housing 15, opening the ball valve 14, rotating the handwheel 41 so as to lower the instrument 35 into the conduit 10, and tightening the gland nut 27 by rotating the handwheel 30.

The gland nut 27 and handwheel 30 are provided to compress the sealing material 33 so as to form the latter into a shape in which it fills all the voids between the screw threads and acts as a seal.

In the construction shown in the drawings the instrument 35 is, in operation, securely held in the conduit 10 by the engagement between the mating threads of the hollow stem 24 and the housing member 16. At the same time, since the gland nut 27 is provided with an internal thread which mates with the external thread of the hollow stem 24 and is provided with an external thread which mates with the internal thread of the recess 26, only minimal leakage paths between the mating threads will be provided for the potential escape of the high pressure fluid in the conduit 10, and these leakage paths will in practice be completely sealed by the sealing material 33 which will be extruded thereinto as a result of the screwing down of the gland nut 27.

If, in contrast to the present invention, the gland nut 27 was not internally threaded and was provided with a plain bore through which the hollow stem 24 passed, there would be a substantial leakage path between the gland nut 27 and the hollow stem 24, which could not be effectively sealed by the sealing material 33.

I claim:

1. A stuffing box for introducing a member into a high pressure conduit and removing it therefrom, said stuffing box comprising a housing member having a threaded passage therethrough and having an internally threaded recess which communicates with one end of the threaded passage and is of greater diameter than the latter, an externally threaded stem which is threaded into and passes through the threaded passage, a gland nut which is disposed in said recess and which annularly surrounds the threaded stem, the gland nut having corresponding internal and external threads which are respectively threaded onto the threaded stem and into the internally threaded recess to form threaded joints therewith, and extrudable sealing material disposed in said recess inwardly of the gland nut and externally of the stem, said sealing material being in engagement with the housing member, the threaded stem and the gland nut, rotation of the gland nut causing said sealing material to be extruded into said threaded joints to seal the latter.

2. A stuffing box as claimed in claim 1 in which the sealing material comprises polytetrafluorethylene.

3. A stuffing box as claimed in claim 1 in which the threaded stem carries or houses part of an instrument which is disposed in the high pressure conduit.

4. A stuffing box as claimed in claim 3 in which the threaded stem is a hollow stem within which is mounted and to which is sealed a stem of the instrument.

5. A stuffing box as claimed in claim 3 in which the housing member forms part of a housing having a valve which is interposed between the said housing member and the conduit, the valve, when open, permitting the instrument to be introduced through the valve and into the conduit, and the valve, when closed after the instrument has been retracted therethrough, dividing the housing into compartments which are sealed from each other, one of said compartments comprising the said housing member and the other compartment being permanently open to the pressure in the conduit.

6. A stuffing box as claimed in claim 5 in which the compartment which comprises the said housing member is provided with a vent valve for venting the pressure therein.

7. A stuffing box as claimed in claim 6 in which the compartment which comprises the said housing member has separable parts to enable the instrument to be withdrawn therefrom, means being provided for preventing separation of said parts except when the vent valve is open.

8. A stuffing box as claimed in any one of claims 1, 3 or 4 wherein the threaded passage in the housing member has substantially the same diameter as the internal threads of the gland nut.

* * * * *